(12) United States Patent
Deng

(10) Patent No.: US 8,325,052 B2
(45) Date of Patent: Dec. 4, 2012

(54) OVER-CURRENT PROTECTION APPARATUS

(75) Inventor: Bo Deng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 236 days.

(21) Appl. No.: 12/970,959

(22) Filed: Dec. 17, 2010

(65) Prior Publication Data

US 2012/0139741 A1 Jun. 7, 2012

(30) Foreign Application Priority Data

Dec. 7, 2010 (CN) .......................... 2010 1 0577097

(51) Int. Cl.
*G08B 21/00* (2006.01)
(52) U.S. Cl. .......... 340/664; 323/273; 361/1; 324/76.11
(58) Field of Classification Search .................. 340/664, 340/660, 661, 662, 657; 324/76.11; 323/273, 323/234; 361/1, 91, 18
See application file for complete search history.

(56) References Cited

U.S. PATENT DOCUMENTS

| | | | |
|---|---|---|---|
| 7,741,820 B2* | 6/2010 | Huang et al. | 323/271 |
| 2002/0049941 A1* | 4/2002 | Lunde et al. | 714/724 |
| 2002/0060605 A1* | 5/2002 | Kowkutla et al. | 330/10 |
| 2007/0036158 A1* | 2/2007 | Hun-Kwon et al. | 370/389 |
| 2009/0189585 A1* | 7/2009 | Huang et al. | 323/285 |
| 2010/0225294 A1* | 9/2010 | Herr et al. | 323/299 |
| 2012/0008344 A1* | 1/2012 | Zeng et al. | 363/21.11 |

* cited by examiner

*Primary Examiner* — George Bugg
*Assistant Examiner* — Edny Labbees
(74) *Attorney, Agent, or Firm* — Altis Law Group, Inc.

(57) ABSTRACT

An over-current protection apparatus includes a first connector connected to a power supply, a second connector connected to a motherboard. A non-inverting input terminal of a comparator receives a voltage from a power supply and compares the received voltage with a preset voltage, when the received voltage is greater than the preset voltage. The comparator outputs a high level signal to control a first electrical switch to be turned on and a second electrical switch to be turned off. A clock pin of a flip-flop receives a high level signal from the second electrical switch, and an output terminal of the flip-flop outputs a low level signal to a third electrical switch, to control the third electrical switch to be turned off. A control pin of a first connector is disconnected to a control pin of a second connector and the power supply does not provide voltages to a motherboard.

9 Claims, 4 Drawing Sheets

OVER-CURRENT PROTECTION APPARATUS

BACKGROUND

1. Field of the Invention

The present disclosure relates to an over-current protection apparatus.

2. Description of Related Art

At present, over-current outputs of a power supply may be caused by short-circuits. When testing motherboards, the over-current outputs may be shorted to the computer motherboard, thereby damaging electronic elements or components on the motherboard or even damage or destroy the motherboard.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of examples and not by limitation. It should be noted that references to "an" or "one" embodiment in this disclosure are not necessarily to the same embodiment, and such references mean at least one.

Figure 1:
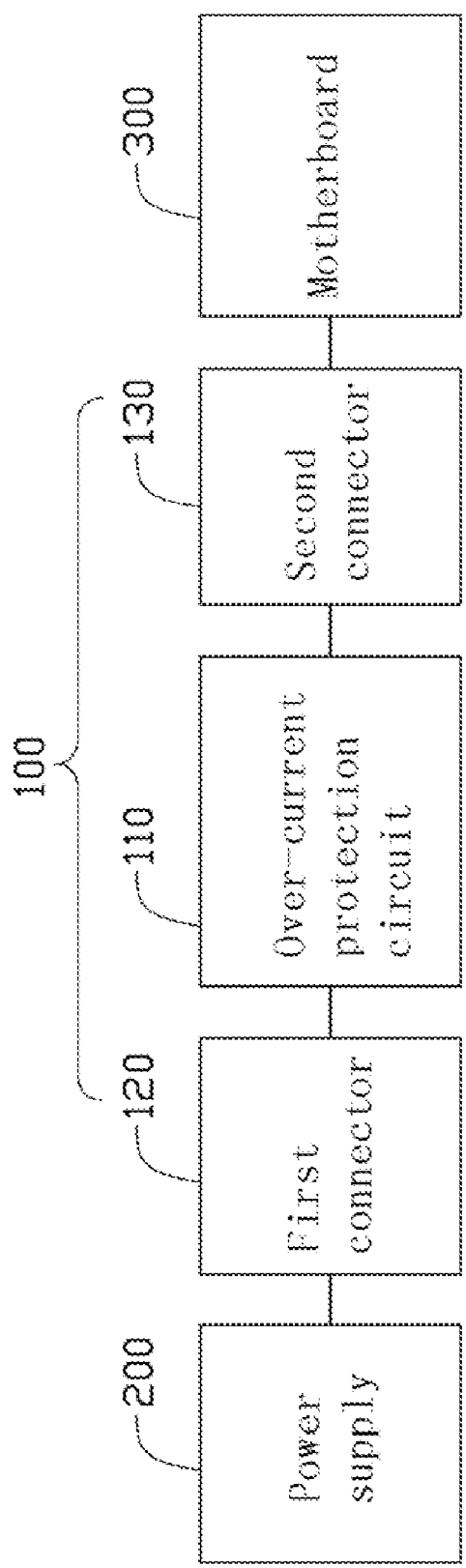
FIG. 1 is a block diagram of an over-current protection apparatus in accordance with an exemplary embodiment of the present disclosure.

Referring to FIG. 1, an over-current protection apparatus 100 in accordance with an exemplary embodiment includes an over-current protection circuit 110, and a first connector 120 and a second connector 130 connected to the over-current protection circuit 110. The first connector 120 is connected to a power supply 200, to receive a voltage from the power supply 200. The second connector 130 is connected to a motherboard 300, to output the received voltage from the power supply 200 to the motherboard 300.

Figure 2:
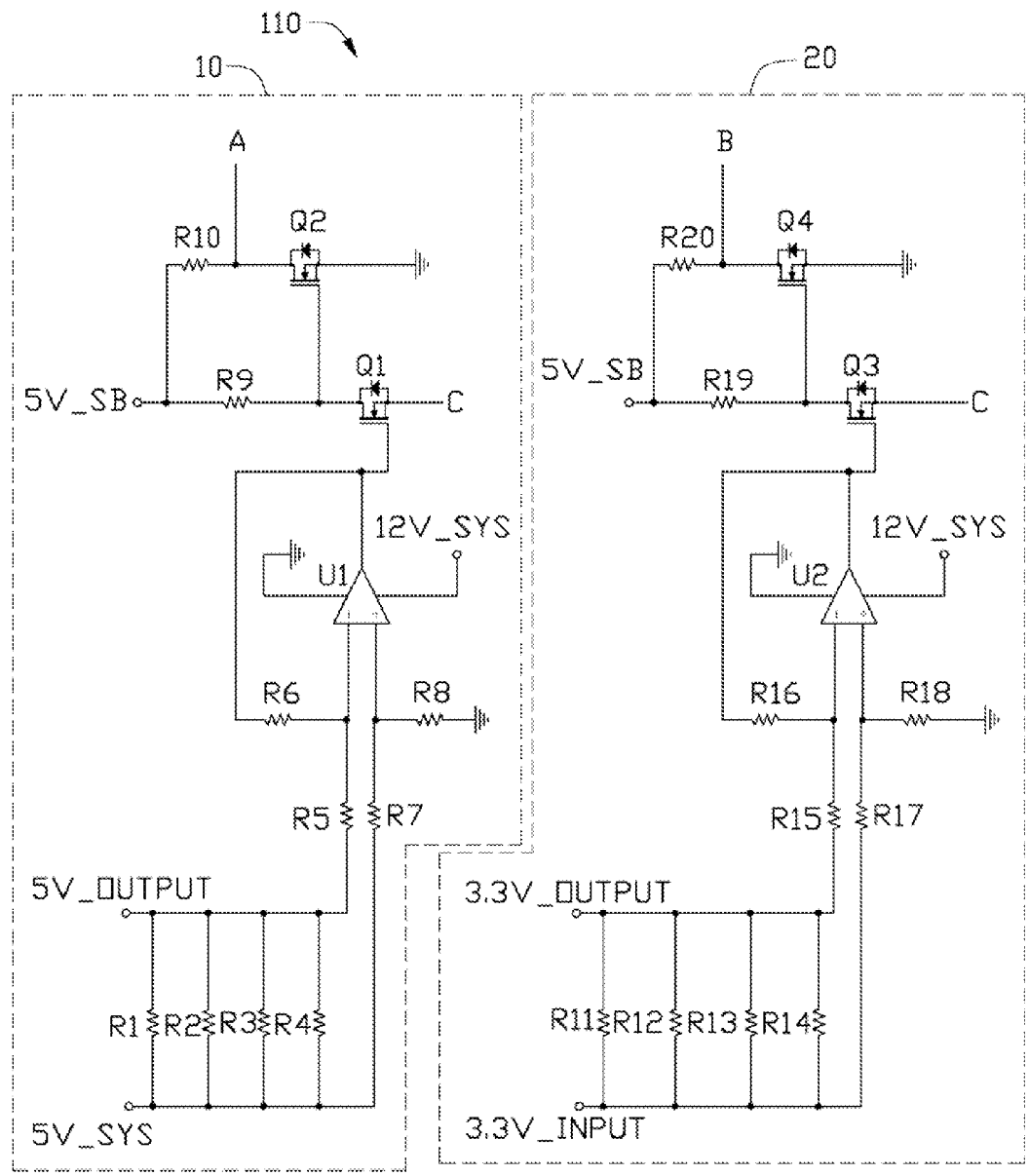
FIG. 2 to FIG. 4 are circuit diagrams of the over-current protection apparatus of FIG. 1.
Figure 3:
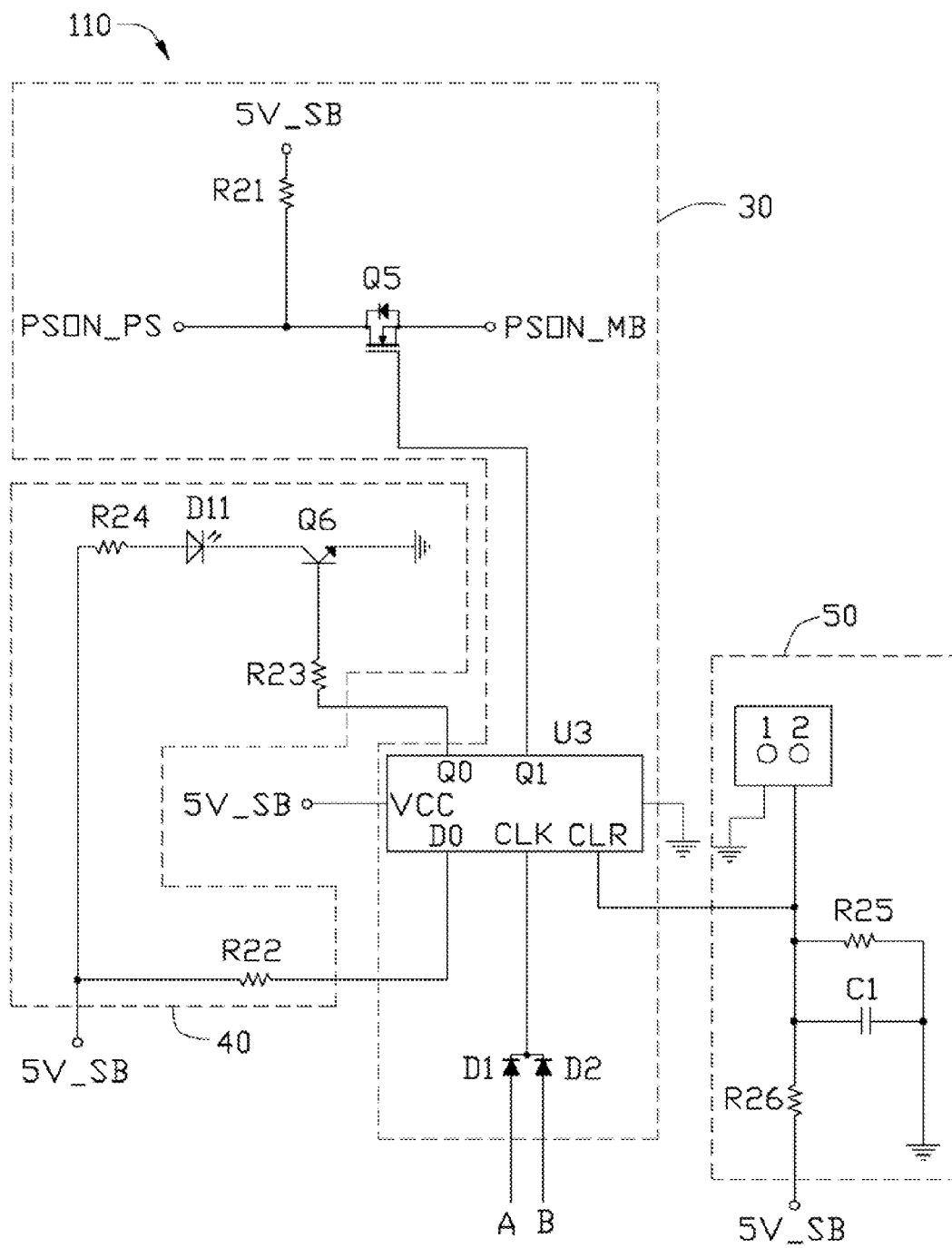
Figure 4:
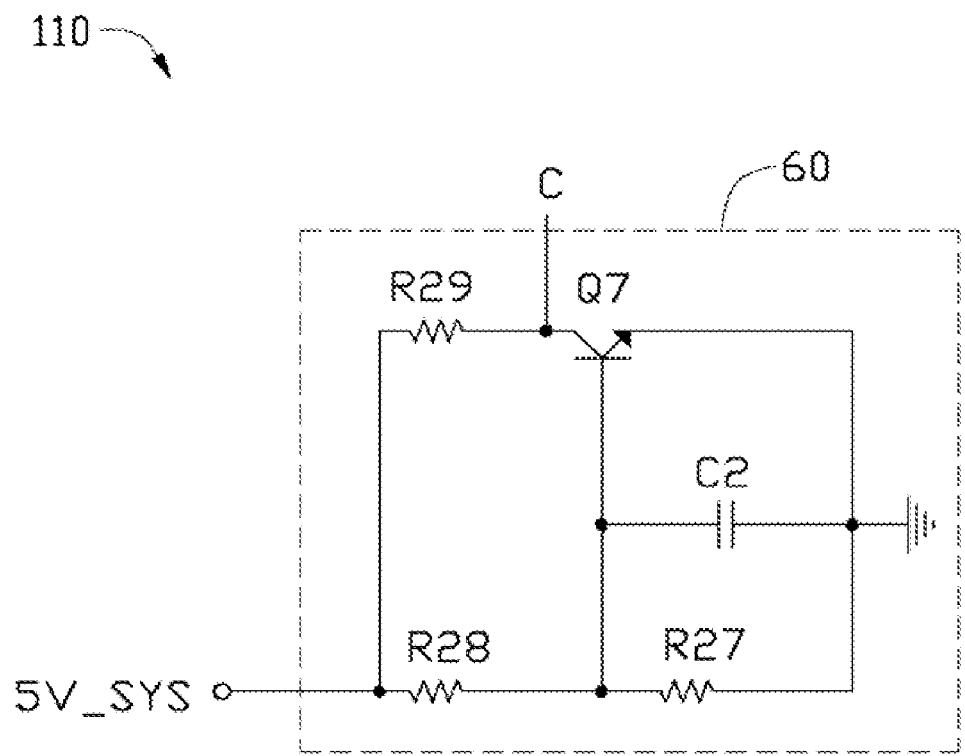

Referring to FIG. 2 to FIG. 4, the over-current protection circuit 110 includes a first detection circuit 10, a second detection circuit 20, a control circuit 30, an indication circuit 40, a reset circuit 50, and a delay circuit 60.

The first detection circuit 10 includes a comparator U1, resistors R1-R10, and two electrical switches, such as two n-channel field effect transistors (FETs) Q1 and Q2. A non-inverting input terminal of the comparator U1 is grounded through the resistor R8, and also connected to a first power pin 5V_SYS of the first connector 120 through the resistor R7 for receiving a 5 volt (V) system voltage from the power supply 200. An inverting input terminal of the comparator U1 is connected to a first power pin 5V_OUTPUT of the second connector 130 through the resistor R5 for outputting 5V to the motherboard 300. The inverting input terminal of the comparator U1 is also connected to a gate of the FET Q1 through the resistor R6 and is connected to an output terminal of the comparator U1. A source of the FET Q1 is connected to the delay circuit 60. A drain of the FET Q1 is connected to a gate of the FET Q2 and is connected to a second power pin 5V_SB of the first connector 120 through the resistor R9 for receiving a 5V standby voltage. A source of the FET Q2 is grounded. A drain of the FET Q2 is connected to the control circuit 30 and connects to the second power pin 5V_SB of the first connector 120 through the resistor R10. The resistors R1-R4 are respectively connected in parallel between the first pin 5V_SYS of the first connector 120 and the first power pin 5V_OUTPUT of the second connector 130. A voltage terminal of the comparator U1 is connected to a third power pin 12V_SYS of the first connector 120, to receive a 12V system voltage from the power supply 200. A ground terminal of the comparator U1 is grounded. In one embodiment, the type of the comparator U1 is LM358DR2.

The second detection circuit 20 includes a comparator U2, resistors R11-R20, and two electrical switches, such as two n-channel FETs Q3 and Q4. A non-inverting input terminal of the comparator U2 is grounded through the resistor R18 and is connected to a fourth power pin 3.3V_INPUT of the first connector 120 through the resistor R17 for receiving a 3.3V system voltage from the power supply 200. An inverting input terminal of the comparator U2 is connected to a second power pin 3.3V_OUTPUT of the second connector 130 through the resistor R15 for outputting 3.3V to the motherboard 300. The inverting input terminal of the comparator U2 is also connected to a gate of the FET Q3 through the resistor R16 and is connected to an output terminal of the comparator U2. A source of the FET Q3 is connected to the delay circuit 60. A drain of the FET Q3 is connected to a gate of the FET Q4 and is connected to the second power pin 5V_SB of the first connector 120 through the resistor R19. A source of the FET Q4 is grounded. A drain of the FET Q4 is connected to the control circuit 30 and is connected to the second power pin 5V_SB of the first connector 120 through the resistor R20 for receiving the 5V standby voltage. The resistors R11-R14 are respectively connected in parallel between the fourth power pin 3.3V_INPUT of the first connector 120 and the second power pin 3.3V_OUTPUT of the second connector 130. A voltage terminal of the comparator U2 is connected to the third power pin 12V_SYS of the first connector 120, to receive the 12V system voltage from the power supply 200. A ground terminal of the comparator U2 is grounded. In one embodiment, the type of the comparator U2 is LM358DR2.

The control circuit 30 includes a flip-flop U3, two diodes D1 and D2, an electrical switch, such as an n-channel FET Q5, and a resistor R21. A clock pin CLK of the flip-flop U3 is connected to cathodes of the diodes D1 and D2. An anode of the diode D1 is connected to the drain of the FET Q2 of the first detection circuit 10. An anode of the diode D2 is connected to the drain of the FET Q4 of the second detection circuit 20. A reset pin CLR of the flip-flop U3 is connected to the reset circuit 50. A voltage pin D0 and an output pin Q0 of the flip-flop U3 are connected to the indication circuit 40. An output pin Q1 of the flip-flop U3 is connected to a gate of the FET Q5. A source of the FET Q5 is connected to a control pin PSON_MB of the second connector 130. A drain of the FET Q5 is connected to a control pin PSON_PS of the first connector 120 and is connected to the second pin 5V_SB of the first connector 120 through the resistor R21. A voltage pin VCC of the flip-flop U3 is connected to the second power pin 5V_SB of the first connector 120. A ground pin of the flip-flop U3 is grounded. In one embodiment, the flip-flop U3 is a 74HC175 flip-flop. The control pin PSON_PS of the first connector 120 controls the power supply 200 to output a voltage to the over-current protection circuit 110. The control pin PSON_MB of the second connector 130 controls the motherboard 300 to receive the voltage from the over-current protection circuit 110.

The indication circuit 40 includes an electrical switch, such as an npn transistor Q6, resistors R22-R24, and a light emitting diode (LED) D11. The output pin Q0 of the flip-flop U3 is connected to a base of the transistor Q6 through the resistor R23. An emitter of the transistor Q6 is grounded. A collector of the transistor Q6 is connected to a cathode of the LED D11. An anode of the LED D11 is connected to the second power pin 5V_SB of the first connector 120 through the resistor R24. The voltage pin D0 of the flip-flop U3 is connected to the second power pin 5V_SB of the first connector 120 through the resistor R22. The LED D11 is lit when over current appears, the LED D11 does not light when current is normal.

The reset circuit 50 includes two jumper pins 1 and 2, resistors R25 and R26, and a capacitor C1. The jumper pin 1 is grounded. The jumper pin 2 is connected to the reset pin CLR of the flip-flop U3 and also connected to the second power pin 5V_SB of the first connector 120 through the resistor R26. The resistor R25 and the capacitor C1 are connected in parallel between the jumper pin 2 and ground.

The delay circuit 60 includes an electrical switch, such as an npn transistor Q7, resistors R27-R29, and a capacitor C2. A base of the transistor Q7 is connected to the first power pin 5V_SYS of the first connector 120 through the resistor R28. A collector of the transistor Q7 is connected to the sources of the FETs Q1 and Q3. The collector of the transistor Q7 is also connected to the first power pin 5V_SYS of the first connector 120 through the resistor R29. The resistor R27 and the capacitor C2 are connected in parallel between the base of the transistor Q7 and ground. An emitter of the transistor Q7 is grounded.

In other embodiments, the number of the first detection circuit 10, the second detection circuit 20, and the diodes D1 and D2 of the control circuit 30 can be changed according to need.

In use, the first connector 120 is connected to the power supply 200, and the second connector 130 is connected to the motherboard 300. The motherboard 300 is powered on, the jumper pins 1 and 2 are connected through a jumper (not shown), to output a low level signal to reset the flip-flop U3 through the reset pin CLR of the flip-flop U3. At the same time, the delay circuit 60 outputs a low level signal to the FETs Q1 and Q3. If a voltage from the power supply 200 input to the non-inverting input terminal of the comparator U1 is greater than 5V, the comparator U1 outputs a high level signal. The FET Q1 is turned on and the FET Q2 is turned off. The diode D1 is turned on and the flip-flop U3 is triggered. The output terminal Q0 of the flip-flop U3 outputs a high level signal. The transistor Q6 is turned on. The collector of the transistor Q6 is at a low level. The LED D11 is lit for indicating an over-current state. At the same time, the output terminal Q1 of the flip-flop U3 outputs a low level signal. The FET Q5 is turned off. The control pin PSON_PS of the first connector 120 is disconnected from the control pin PSON_MB of the second connector 130. Namely, the power supply 200 does not provide voltages to the motherboard 300 for avoiding damage to the motherboard 300.

If a voltage from the power supply 200 input to the non-inverting input terminal of the comparator U2 is greater than 3.3V, the comparator U2 outputs a high level signal. The FET Q3 is turned on and the FET Q4 is turned off. The diode D1 is turned on and the flip-flop U3 is triggered. The output terminal Q0 of the flip-flop U3 outputs a high level signal. The transistor Q6 is turned on. The collector of the transistor Q6 is at a low level. The LED D11 is lit for indicating an over-current state. At the same time, the output terminal Q1 of the flip-flop U3 outputs a low level signal. The FET Q5 is turned off. The control pin PSON_PS of the first connector 120 is disconnected from the control pin PSON_MB of the second connector 130. Namely, the power supply 200 does not provide voltages to the motherboard 300 for avoiding damage to the motherboard 300.

The over-current protection apparatus 100 can control the power supply 200 not to provide voltages to the motherboard 300 when over-current output from the power supply 200 appears. Therefore, the over-current protection apparatus 100 can prevent an over-current output of the power supply 200 from damaging the motherboard 300.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An over-current protection apparatus comprising:
a first connector to be connected to a power supply, the first connector comprising a first power pin and a second power pin;
a second connector to be connected to a motherboard, the second connector comprising a first power pin; and
an over-current protection circuit comprising:
a detection circuit comprising a comparator, first to third resistors, and first and second electrical switches each having first to third terminals, wherein a non-inverting input terminal of the comparator is connected to the first power pin of the first connector, an inverting input terminal of the comparator is connected to a first power pin of the second connector, the first terminal of the first electrical switch is connected to an output terminal of the comparator, the second terminal of the first electrical switch is connected to the first terminal of the second electrical switch and also connected to the second power pin of the first connector through the first resistor, the second terminal of the second electrical switch is connected to the second power pin of the first connector through the second resistor, the third resistor is connected between the first power pins of the first and the second connectors, a voltage terminal of the comparator is connected to a third power pin of the first connector; and
a control circuit comprising a flip-flop, a third electrical switch with first to third terminals, and a fourth resistor, wherein a clock pin of the flip-flop is connected to the second terminal of the second electrical switch, a first output pin of the flip-flop is connected to the first terminal of the third electrical switch, the second terminal of the third electrical switch is connected to a control pin of the first connector and also connected to the second power pin of the first connector through the fourth resistor, the third terminal of the third electrical switch is connected to a control pin of the second connector, a first voltage pin of the flip-flop is connected to the second power pin of the first connector.

2. The over-current protection apparatus of claim 1, wherein the detection circuit further comprising fifth to eleventh resistors, the fifth to the seventh resistors and the third resistor are connected in parallel between the first power pins of the first and the second connectors, the eighth resistor is connected between the inverting input terminal of the comparator and the first power pin of the second connector, the ninth resistor is connected between the non-inverting input terminal of the comparator and the first power pin of the first connector, the tenth resistor is connected between the inverting input terminal and the output terminal of the comparator, the eleventh resistor is connected between the non-inverting input terminal of the comparator and ground.

3. The over-current protection apparatus of claim 1, wherein the control circuit further comprises a diode, an anode of the diode is connected to the second terminal of the second electrical switch, a cathode of the diode is connected to the clock pin of the flip-flop.

4. The over-current protection apparatus of claim 1, wherein the first to third electrical switches are n-channel field effect transistors, the first to third terminals of the first to third electrical switches are corresponding to gates, drains, and sources of the field effect transistors.

5. The over-current protection apparatus of claim 2, further comprising an indication circuit, wherein the indication circuit comprises a fourth electrical switch, twelfth to fourteenth resistors, and a light emitting diode (LED), a second output pin of the flip-flop is connected to a first terminal of the fourth electrical switch through the twelfth resistor, a second terminal of the fourth electrical switch is grounded, a third terminal of the fourth electrical switch is connected to a cathode of the LED, an anode of the LED is connected to the second power pin of the first connector through the thirteenth resistor, a second voltage pin of the flip-flop is connected to the second power pin of the first connector through the fourteenth resistor.

6. The over-current protection apparatus of claim 5, wherein the fourth electrical switch is an npn transistor, the first to third terminals of the fourth electrical switch are corresponding to a base, an emitter, and a collector of the transistor.

7. The over-current protection apparatus of claim 5, further comprising a reset circuit, wherein the reset circuit comprises first and second jumper pins, fifteenth and sixteenth resistors, and a first capacitor, the first jumper pin is grounded, the second jumper pin is connected to a reset pin of the flip-flop and also connected to the second power pin of the first connector through the sixteenth resistor, the fifteenth resistor and the first capacitor are connected in parallel between the second jumper pin and ground.

8. The over-current protection apparatus of claim 7, further comprising a delay circuit, wherein the delay circuit comprises a fifth electrical switch, seventeenth to nineteenth resistors, and a second capacitor, a first terminal of the fifth electrical switch is connected to the first power pin of the first connector through the eighteenth resistor, a second terminal of the fifth electrical switch is connected to the third terminal of the first electrical switch, the second terminal of the fifth electrical switch is also connected to the first power pin of the first connector through the nineteenth resistor, the seventeenth resistor and the second capacitor are connected in parallel between the first terminal of the fifth electrical switch and ground, a third terminal of the fifth electrical switch is grounded.

9. The over-current protection apparatus of claim 8, wherein the fifth electrical switch is an npn transistor, the first to third terminals of the fifth electrical switch are corresponding to a base, a collector, and an emitter of the transistor.

\* \* \* \* \*